(12) United States Patent
Jo

(10) Patent No.: US 12,266,775 B2
(45) Date of Patent: Apr. 1, 2025

(54) BATTERY MODULE

(71) Applicant: LG Energy Solution, Ltd., Seoul (KR)

(72) Inventor: Woosik Jo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 601 days.

(21) Appl. No.: 17/599,241

(22) PCT Filed: May 7, 2020

(86) PCT No.: PCT/KR2020/005992
§ 371 (c)(1),
(2) Date: Sep. 28, 2021

(87) PCT Pub. No.: WO2020/231071
PCT Pub. Date: Nov. 19, 2020

(65) Prior Publication Data
US 2022/0173453 A1 Jun. 2, 2022

(30) Foreign Application Priority Data
May 10, 2019 (KR) .......................... 10-2019-0055223

(51) Int. Cl.
*H01M 10/653* (2014.01)
*H01M 10/613* (2014.01)
(Continued)

(52) U.S. Cl.
CPC ....... *H01M 10/653* (2015.04); *H01M 10/613* (2015.04); *H01M 10/615* (2015.04);
(Continued)

(58) Field of Classification Search
CPC ............. H01M 10/653; H01M 10/613; H01M 10/615; H01M 10/625; H01M 10/647; H01M 10/6571; H01M 2220/20
See application file for complete search history.

(56) References Cited

U.S. PATENT DOCUMENTS

| 5,639,571 A | 6/1997 | Waters et al. |
| 2012/0282506 A1 | 11/2012 | Hohenthanner et al. |

(Continued)

FOREIGN PATENT DOCUMENTS

| CN | 102576824 A | 7/2012 |
| CN | 103094639 A | 5/2013 |

(Continued)

OTHER PUBLICATIONS

International Search Report for Application No. PCT/KR2020/005992 mailed Oct. 12, 2020, pp. 1-3.
(Continued)

*Primary Examiner* — Adam A Arciero
(74) *Attorney, Agent, or Firm* — Lerner David LLP

(57) ABSTRACT

A battery module according to an exemplary embodiment of the present invention includes: a battery cell stack made by stacking a plurality of battery cells adjacent to one another in parallel; and a heating/cooling composite fin interposed between adjacent battery cells of the battery cell stack. The heating/cooling composite fin includes: a compressive pad positioned between the adjacent battery cells; cooling fins each positioned between the compressive pad and a respective one of the adjacent battery cells; and heating films each positioned between the compressive pad and a respective one of the cooling fins.

12 Claims, 7 Drawing Sheets

(51) Int. Cl.
  *H01M 10/615* (2014.01)
  *H01M 10/625* (2014.01)
  *H01M 10/647* (2014.01)
  *H01M 10/6571* (2014.01)
  *H01M 50/211* (2021.01)

(52) U.S. Cl.
  CPC ....... *H01M 10/625* (2015.04); *H01M 10/647* (2015.04); *H01M 10/6571* (2015.04); *H01M 50/211* (2021.01); *H01M 2220/20* (2013.01)

(56) References Cited

U.S. PATENT DOCUMENTS

| | | | |
|---|---|---|---|
| 2013/0071718 | A1 | 3/2013 | Cho et al. |
| 2013/0108897 | A1* | 5/2013 | Christian ............ H01M 10/647 429/50 |
| 2013/0244078 | A1 | 9/2013 | Kwak et al. |
| 2014/0050964 | A1 | 2/2014 | Korosi et al. |
| 2014/0318746 | A1 | 10/2014 | Kwak et al. |
| 2016/0079639 | A1* | 3/2016 | Pinon ................ H01M 10/6556 429/120 |
| 2016/0087319 | A1 | 3/2016 | Roh et al. |
| 2017/0331164 | A1 | 11/2017 | Kwon |
| 2018/0062225 | A1 | 3/2018 | You et al. |
| 2018/0175468 | A1 | 6/2018 | Shin et al. |
| 2018/0183117 | A1 | 6/2018 | Cho et al. |
| 2019/0006725 | A1 | 1/2019 | Nam et al. |
| 2019/0081293 | A1 | 3/2019 | Hwang |
| 2021/0288387 | A1* | 9/2021 | Cho ..................... H01M 50/50 |

FOREIGN PATENT DOCUMENTS

| | | | |
|---|---|---|---|
| CN | 103563145 | A | 2/2014 |
| CN | 104124488 | A | 10/2014 |
| CN | 107735882 | A | 2/2018 |
| CN | 108028324 | A | 5/2018 |
| CN | 207459121 | U | 6/2018 |
| EP | 2955780 | A1 | 12/2015 |
| EP | 3244478 | A1 | 11/2017 |
| EP | 3297090 | A1 | 3/2018 |
| EP | 3309865 | A1 | 4/2018 |
| JP | 2013125617 | A | 6/2013 |
| JP | 2014511553 | A | 5/2014 |
| JP | 2019040745 | A | 3/2019 |
| JP | 2019061895 | A | 4/2019 |
| KR | 20120060879 | A | 6/2012 |
| KR | 20130031147 | A | 3/2013 |
| KR | 20130136157 | A | 12/2013 |
| KR | 101428383 | B1 | 8/2014 |
| KR | 20160118061 | A | 10/2016 |
| KR | 20160146587 | A | 12/2016 |
| KR | 20170019041 | A | 2/2017 |
| KR | 20170095040 | A | 8/2017 |
| KR | 20170113903 | A | 10/2017 |
| KR | 20180005456 | A | 1/2018 |
| KR | 101865940 | B1 | 6/2018 |
| WO | WO-2020075966 A1 * | | 4/2020 ............ H01M 50/20 |

OTHER PUBLICATIONS

Search Report dated Sep. 7, 2023 from the Office Action for Chinese Application No. 202080029497.3 issued Sep. 9, 2023, pp. 1-3. [See pp. 1-2, categorizing the cited references].

Extended European Search Report including Written Opinion for Application No. 20806343.8 dated Sep. 16, 2022, pp. 1-5.

Search Report dated Jun. 6, 2024 from the Office Action for Chinese Application No. 202080029497.3 issued Jun. 8, 2024, 2 pgs.

* cited by examiner

BATTERY MODULE

CROSS-REFERENCE TO RELATED APPLICATIONS

This application is a national phase entry under 35 U.S.C. § 371 of International Application No. PCT/KR2020/005992 filed on May 7, 2020, which claims priority from Korean Patent Application No. 10-2019-0055223 filed on May 10, 2019, the entire contents of which are incorporated herein by reference.

TECHNICAL FIELD

The present invention relates to a battery module, and more particularly, to a battery module capable of more uniformly and efficiently controlling a process of cooling and heating the module.

BACKGROUND ART

As development of technologies and demands for mobile devices are increased, there is a rapidly increasing demand for rechargeable batteries as energy sources. Therefore, many studies are being conducted on rechargeable batteries in order to meet various needs.

The rechargeable battery is attracting lots of interest as an energy source for power devices such as an electric bicycle, an electric vehicle, and a hybrid electric vehicle as well as mobile devices such as a mobile phone, a digital camera, and a notebook computer.

A small-sized battery pack, in which one battery cell is packed, is used for a small-sized device such as a mobile phone or a camera. However, a middle-sized or large-sized battery pack, in which two or more battery cells are packed and connected in parallel and/or in series, is used for a middle-sized or large-sized device such as a notebook computer or an electric vehicle. Therefore, the number of battery cells included in the battery pack may be variously set depending on a required output voltage or a required charging/discharging capacity.

Meanwhile, in order to configure the battery pack by connecting the plurality of battery cells in series/in parallel, generally, a battery module having at least one battery cell is configured first, and then the battery pack is configured by using at least one battery module and adding other constituent elements.

The battery cell included in the battery module exhibits optimum operating performance within a predetermined temperature range. If a peripheral temperature is too low or high while deviating from the temperature range, the operating performance of the battery cell deteriorates.

In particular, in a case in which the battery cell is used outdoors like the battery cell in the battery pack used for a vehicle or an energy storage system (ESS), the battery cell may be exposed to an extreme temperature situation in accordance with seasonal changes such as summer or winter. Further, in a case in which a plurality of battery cells is used, the plurality of battery cells may undergo a situation in which a temperature is increased by the amount of heat generated from the battery cell itself. Accordingly, it is necessary to appropriately control a process of cooling and heating the battery module in order to maintain the optimum operating performance of the battery cell.

DISCLOSURE

Technical Problem

The present invention has been made in an effort to provide a structure of a battery module capable of being uniformly and efficiently heated so that the battery module normally operates even in a cryogenic environment, and capable of being efficiently cooled.

However, the object to be achieved by the exemplary embodiments of the present invention is not limited to the above-mentioned object but may be variously expanded without departing from the technical spirit of the present invention.

Technical Solution

A battery module according to an exemplary embodiment of the present invention includes: a battery cell stack made by stacking a plurality of battery cells adjacent to one another in parallel; and a heating/cooling composite fin interposed between the adjacent battery cells among the plurality of battery cells, in which the heating/cooling composite fin includes: a compressive pad positioned between the adjacent battery cells; cooling fins each positioned between the compressive pad and the battery cell; and heating films each positioned between the compressive pad and the cooling fin.

The heating/cooling composite fin may further include coating films each positioned between the cooling fin and the battery cell.

The heating film may include: a heating element connected to an external power source and configured to generate heat; and a base film on which the heating element is provided.

The heating/cooling composite fin may include: the pair of cooling fins provided between the adjacent battery cells and facing the battery cells positioned at both sides thereof; the pair of heating films provided between the pair of cooling fins and facing the cooling fins; and the compressive pad interposed between the pair of heating films.

The heating/cooling composite fin may include a pair of coating films positioned between each of the pair of cooling fins and each of the battery cells.

The battery module may include a module frame including at least one surface on which the battery cell stack is received.

The battery module may further include a resin layer positioned between the battery cell stack and the module frame, and the cooling fin may be in contact with the resin layer.

The cooling fin may be made of aluminum.

The compressive pad may contain polyurethane or EDPM (ethylene propylene diene monomer).

The coating film may be a graphite coating.

The heating/cooling composite fin may be positioned corresponding to an area of a part of the battery cell.

The compressive pad, the cooling fin, and the heating film may be positioned corresponding to an area of a part of the battery cell, and the coating film may be provided on one surface of the battery cell so as to correspond to an entire area of the battery cell.

Another exemplary embodiment of the present invention provides a battery pack including at least one battery module described above, and a pack casing configured to package at least one battery module.

Still another exemplary embodiment of the present invention provides a device including at least one battery pack.

According to the exemplary embodiments, the battery module may be uniformly, entirely, and quickly heated so that the battery module may normally operate even in a cryogenic environment. Further, it is possible to provide the battery module having excellent cooling efficiency by more efficiently discharging heat to the outside when the battery module generates the heat.

MODE FOR INVENTION

Figure 1:
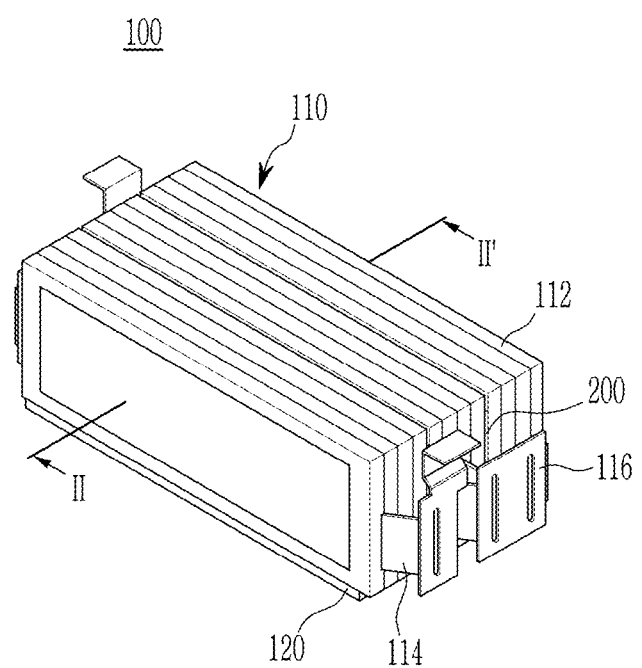
FIG. 1 is a perspective view illustrating a battery module according to an exemplary embodiment of the present invention.

Hereinafter, several exemplary embodiments of the present invention will be described in detail with reference to the accompanying drawings so that those with ordinary skill in the art to which the present invention pertains may easily carry out the exemplary embodiments. The present invention may be implemented in various different ways and is not limited to the exemplary embodiments described herein.

A part irrelevant to the description will be omitted to clearly describe the present invention, and the same or similar constituent elements will be designated by the same reference numerals throughout the specification.

In addition, a size and a thickness of each constituent element illustrated in the drawings are arbitrarily shown for convenience of description, but the present invention is not limited thereto. In order to clearly describe several layers and regions, thicknesses thereof are enlarged in the drawings. In the drawings, the thicknesses of some layers and regions are exaggerated for convenience of description.

In addition, when one component such as a layer, a film, a region, or a plate is described as being positioned "above" or "on" another component, one component can be positioned "directly on" another component, and one component can also be positioned on another component with other components interposed therebetween. On the contrary, when one component is described as being positioned "directly on" another component, there is no component therebetween. In addition, when a component is described as being positioned "above" or "on" a reference part, the component may be positioned "above" or "below" the reference part, and this configuration does not necessarily mean that the component is positioned "above" or "on" the reference part in a direction opposite to gravity.

Throughout the specification, unless explicitly described to the contrary, the word "comprise/include" and variations such as "comprises/includes" or "comprising/including" will be understood to imply the inclusion of stated elements, not the exclusion of any other elements.

Throughout the specification, the word "in a plan view" means when an object is viewed from above, and the word "in a cross-sectional view" means when a cross section made by vertically cutting an object is viewed from a lateral side.

FIG. 1 is a perspective view illustrating a battery module according to an exemplary embodiment of the present invention.

Referring to FIG. 1, a battery module 100 according to an exemplary embodiment of the present invention includes a battery cell stack 110 made by stacking battery cells 112, and a module frame 120 having at least one surface on which the battery cell stack 110 is received.

The battery cell stack 110 is an assembly of a rechargeable battery including the plurality of battery cells 112. The battery cell stack 110 may include the plurality of battery cells 112, and each of the battery cells includes an electrode lead 114. The battery cell 112 may be, but is not limited to, a pouch-type battery cell having a plate shape. The electrode lead 114 may be a positive electrode lead or a negative electrode lead. An end of the electrode lead 114 of each of the battery cells 112 may be bent in one direction and thus may be in contact with an end of an electrode lead of another adjacent battery cell 112. The two electrode leads 114, which are in contact with each other, may be fixed by means of a busbar 116 by welding or the like, such that the battery cells 112 may be electrically connected in the battery cell stack 110. In addition, the busbar 116 may be configured to electrically connect the electrode lead 114 to an external component.

The plurality of battery cells 112 is vertically stacked so that the electrode leads 114 are aligned in one direction, thereby constituting the battery cell stack 110. The battery cell stack 110 is received on the module frame 120 having at least one surface on which the battery cell stack 110 is received. The structure of the module frame 120 is not particularly limited as long as the structure may receive the battery cell stack 110. The module frame 120 may have an integrated structure that covers the remaining sides except for the sides through which the electrode leads 114 of the battery cell stack 110 are exposed, or the module frame 120 may be formed by combining separate plates that cover the respective sides.

Figure 2:
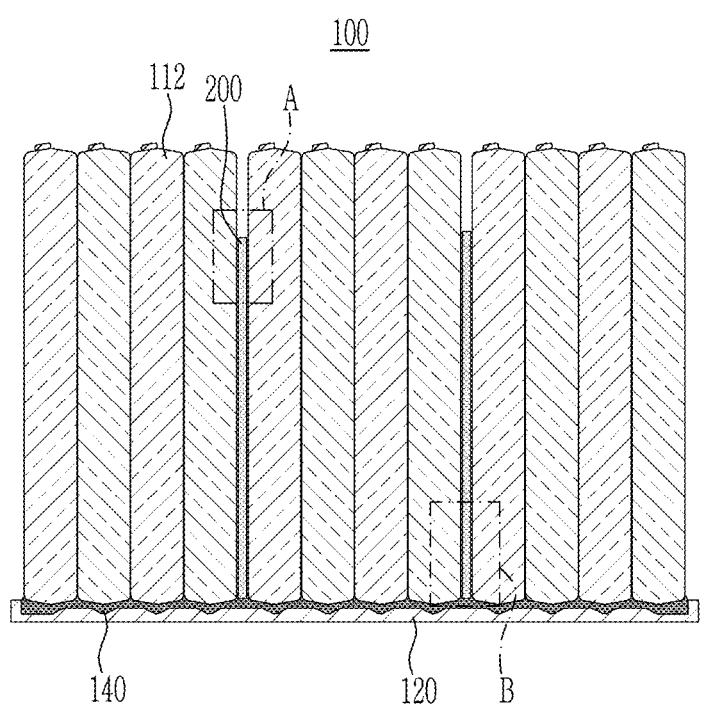
FIG. 2 is a cross-sectional view taken along line II-II' in FIG. 1.
Figure 3:
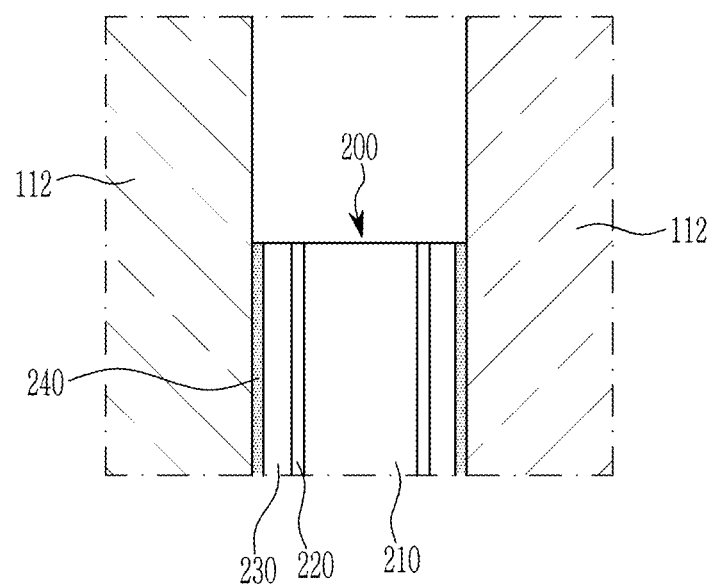
FIG. 3 is an enlarged view of part A in FIG. 2.
Figure 4:
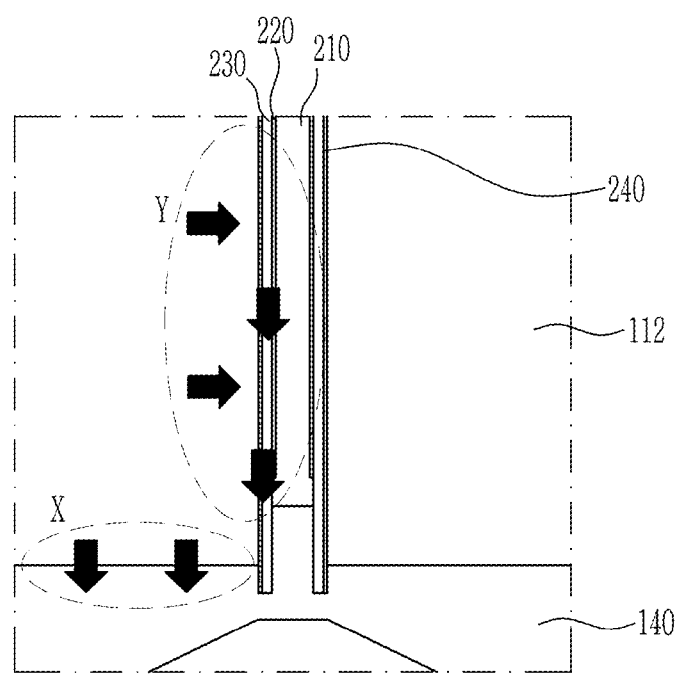
FIG. 4 is an enlarged view of part B in FIG. 2.

FIG. 2 is a cross-sectional view taken along line II-II' in FIG. 1, FIG. 3 is an enlarged view of part A in FIG. 2, and FIG. 4 is an enlarged view of part B in FIG. 2.

Referring to FIGS. 2 to 4, the battery module 100 according to the exemplary embodiment of the present invention includes heating/cooling composite fins 200 each interposed between the adjacent battery cells 112 among the plurality of battery cells 112 included in the battery cell stack 110. In addition, the heating/cooling composite fin 200 includes a pair of cooling fins 230 disposed opposite to each other with a compressive pad 210 interposed therebetween, and a pair of heating films 220 each positioned between the cooling fin 230 and the compressive pad 210. In addition, the heating/cooling composite fin 200 further includes coating films 240 positioned between the cooling fins 230 and the battery cells 112, respectively.

In addition, as illustrated in FIG. 2, the battery module 100 further includes a resin layer 140 positioned between the battery cell stack 110 and the module frame 120. The resin layer 140 may be made of a thermally conductive material, for example, thermal resin in order to discharge, to the outside, the heat generated from the battery cell stack 100. Examples of the thermal resin may include silicone, urethane, epoxy, and the like. According to the exemplary embodiment of the present invention, the heating/cooling composite fin 200 interposed between the battery cells 112 extends along one surface of the battery cell 112 and is in contact with the resin layer 140, such that it is possible to discharge the heat more effectively from the battery cell 112 in comparison with the case in which only the resin layer 140 is provided.

That is, as illustrated in FIG. 4, only the resin layer 140 is provided in the related art, and as a result, the heat may be discharged only along the arrows indicated in part X. In contrast, in the exemplary embodiment of the present invention, the heat is additionally discharged along the cooling fins 230 provided in the heating/cooling composite fin 200, that is, along the arrows indicated in part Y, and as a result, it is possible to obtain an additional cooling effect. In this case, the cooling fin 230 may be made of, but is not particularly limited to, metal, such as aluminum, silver, or copper, having high thermal conductivity. Particularly, the cooling fin made of aluminum may be used.

In particular, in the exemplary embodiment of the present invention, since the coating film 240 is further included between the cooling fin 230 and the battery cell 112, it is possible to improve the cooling effect and prevent the heat generated from the battery cell 112 from being locally accumulated, which causes a temperature deviation. For example, the coating film 240 may be a graphite coating having high thermal conductivity and thus disperses the heat without a local temperature deviation caused by the heat generated by the battery cell and the heat being discharged when the battery cell is cooled. In addition, the coating film 240 may have a thickness of 10 μm to 1,000 μm. The larger thickness of the coating film 240 is advantageous in terms of heat transfer. However, the above-mentioned range is appropriate in consideration of manufacturing costs and design specifications. In particular, the thickness of the coating film 240 may be 50 μm to 150 μm. In addition, while the coating film has been described in the present exemplary embodiment, a configuration in which a graphite sheet is inserted instead of a coating may be applied.

The heating film 220 is positioned between the cooling fin 230 and the compressive pad 210. The heating film 220 may be configured to autonomously generate heat by being supplied with power from the outside and raise a temperature of the battery module 100 by heating the battery module 100 when an overall temperature of the battery module 100 is low in a cryogenic environment or the like. There may occur a problem with safety such as lithium plating (a situation in which lithium is precipitated on a surface of the electrode) that may be caused during a process of charging the battery cell in a low temperature situation. Therefore, there is a need for a means for raising a temperature of the battery cell 112 within a short time. To this end, the heating film 220 is provided.

The heating film 220 according to the exemplary embodiment of the present invention is positioned to face one surface of the battery cell 112 and be disposed between the battery cells 112 with the cooling fin 230 interposed therebetween. In the related art, if a heating means is positioned to be in direct contact with one surface of the battery cell 112, there may occur a problem with safety because heat is applied directly to the battery cell 112. Therefore, the heating means is positioned on a bottom wall of the battery module 100 or at a lateral side at which the busbar 116 is positioned. In this case, the heat is applied indirectly to the battery cell 112, which may increase the time it takes to heat the battery cell 112, increase a temperature deviation in the battery module 100, and thus cause a problem with degradation and safety of the battery module.

However, the heating film 220 according to the exemplary embodiment of the present invention is positioned to face one surface of the battery cell 112 and is positioned between the battery cells 112 with the cooling fin 230 interposed therebetween as described above. Therefore, the heating film 220 may uniformly transfer heat to the battery cell 112 in a situation in which a temperature is low in order to heat the battery cell 112 to a temperature at which the battery cell 112 may normally operate. In addition, since the heating film 220 is positioned to face one surface of the battery cell 112, it is possible to raise the temperature of the battery cell 112 to an appropriate temperature within a short time.

In this process, since the cooling fin 230 and the coating film 240 are positioned between the battery cell 112 and the heating film 220, the heat transferred from the heating film 220 is uniformly dispersed to the entire battery cell 112, such that it is possible to prevent a risk that the heat is locally accumulated. Further, since the overall temperature of the battery module 100 is uniformly raised, it is possible to prevent a problem with degradation and safety even though the battery module 100 is immediately used.

The heating film 220 may include, but is not particularly limited to, a heating element connected to an external power source and configured to generate heat, and a base film on which the heating element is formed. A thin SUS plate, a nichrome wire, a thin carbon or copper plate, or a thin aluminum plate may be used as the heating element, and a film containing polyimide, silicone, or Teflon may be used as the base film, but the present invention is not particularly limited thereto. That is, a film type heater configured such that the base film surrounds the heating element may be used. A smaller thickness of the heating film 220 is advantageous to minimize an increase in volume of the module, but the present invention is not particularly limited thereto. For example, a thickness of the heating film 220 may be 0.05 mm to 0.4 mm.

The coating film 240, the cooling fin 230, and the heating film 220 are positioned between the adjacent battery cells 112 in the order from the closest to the battery cell 112, and the compressive pad 210 is positioned adjacent to the heating film 220. That is, the compressive pad 210 is positioned in a middle portion of the heating/cooling composite fin 200 positioned between the battery cells 112, and the heating films 220, the cooling fins 230, and the coating films 240 are symmetrically positioned at both sides of the compressive pad 210 with the compressive pad 210 interposed therebetween.

The compressive pad 210 serves to absorb impact from the heating films 220, the cooling fins 230, and the coating films 240 positioned at both sides of the compressive pad 210 so that the heating films 220, the cooling fins 230, and the coating films 240 may be stably positioned between the battery cells 112. In addition, the compressive pad 210 is compressed when the battery cell 112 expands in the future, thereby coping with a change in thickness of the battery cell 112 and controlling swelling of the battery cell 112. Therefore, it is possible to prevent damage to the battery module 100 caused by the expansion of the battery cell 112. In addition, since the compressive pad 210 is positioned between the heating films 220, an interval between the heating films 220 may be appropriately maintained, thereby preventing a rapid change in temperature caused by the heating films 220.

The compressive pad 210 may be made of a soft and elastic material such as polyurethane (PU) or EDPM (ethylene propylene diene monomer). This material has excellent vibration absorptivity and excellent repulsive force against compression, and thus may provide the battery module 100 having excellent dimension stability even though the plurality of battery cells 112 swells. In addition, a thickness of the compressive pad 210 may be appropriately designed in consideration of the components such as the battery cells, the compressive pads, the heating films, and the cooling fins in the battery module. That is, a degree to which the battery cell expands may vary depending on chemical characteristics and usage environments of the battery cell. Therefore, the thickness of the compressive pad 210 may be selected within a range in which the thickness of the maximally compressed compressive pad 210 may bear the thickness of the expanded battery cell in consideration of the degree to which the battery cell expands.

Figure 7:
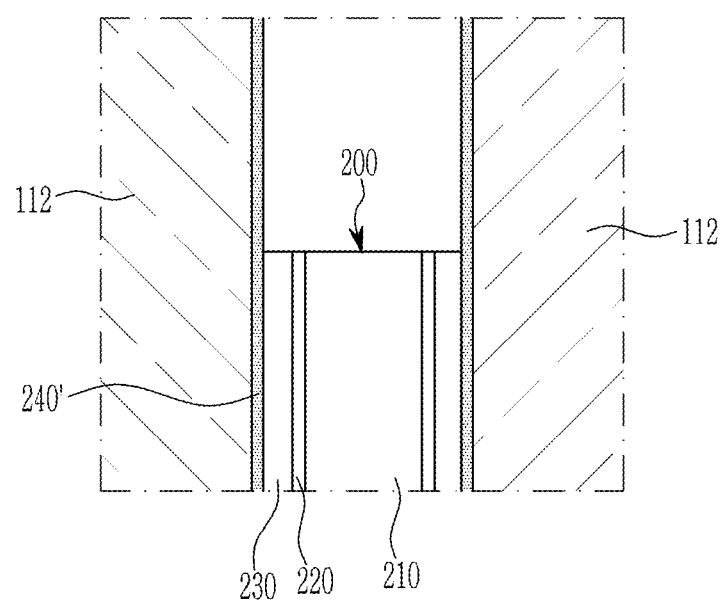
FIG. 7 is a cross-sectional view illustrating an enlarged part of a battery module according to another exemplary embodiment of the present invention.

As illustrated in FIG. 2, the heating/cooling composite fin 200 including the compressive pad 210, the heating films 220, the cooling fins 230, and the coating films 240 may be formed to have an area corresponding to a height somewhat lower than an overall height of the battery cell 112. Alternatively, as illustrated in FIG. 7 related to another exemplary embodiment of the present invention, each of the compressive pad 210, the heating film 220, and the cooling fin 230 has a lower height than the battery cell 112, and a coating film 240' may correspond to the entire surface of the battery cell 112. In this case, the coating film 240' may be directly applied to one surface of the battery cell 112. In this case, the heat locally accumulated when heating and cooling the battery module by the coating film 240' may be uniformly dispersed to the entire surface of the battery cell 112. Therefore, an effect of uniformly dispersing the heat may be achieved even though the areas of the compressive pad 210, the heating film 220, and the cooling fin 230 are small.

In addition, although not illustrated in the drawings, a double-sided tape may be further used to stably combine the components. That is, the double-sided tape may be provided between the heating/cooling composite fin 200 and the battery cell 112, thereby preventing movements of the components and more stably maintaining the configuration of the battery module even though external vibration occurs. In addition, the double-sided tape may be provided not only between the heating/cooling composite fin 200 and the battery cell 112, but also between the compressive pad 210 and the heating film 220 or at other portions in order to solve vulnerability to vibration.

Figure 5:
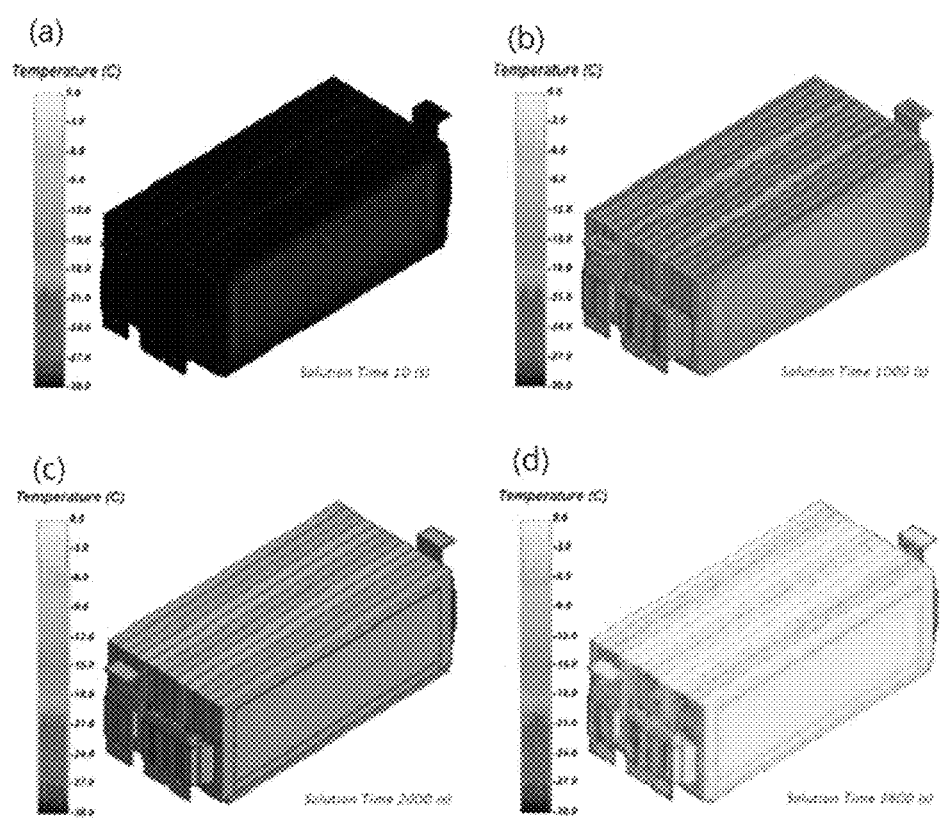
FIG. 5 is a view illustrating a result of performing a simulation on and analyzing a change in temperature during a process of heating the battery module according to the exemplary embodiment of the present invention.
Figure 6:
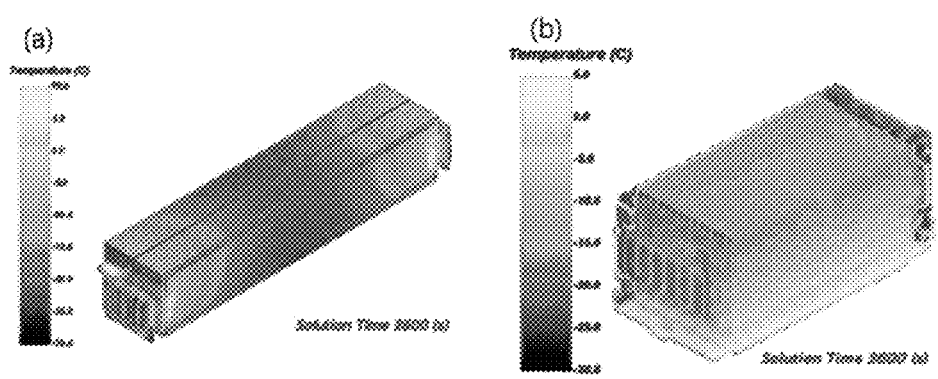
FIG. 6 is a view illustrating a result of performing a simulation on and analyzing a change in temperature during a process of heating a battery module according to a comparative example of the present invention.

FIG. 5 is a view illustrating a result of measuring a change in temperature during a process of heating the battery module according to the exemplary embodiment of the present invention, and FIG. 6 is a view illustrating a result of measuring a change in temperature during a process of heating a battery module according to a comparative example of the present invention.

Referring to FIGS. 5 and 6, it can be ascertained that the uniform distribution of heat and the quick heating effect may be achieved by the exemplary embodiment of the present invention.

FIG. 5 illustrates a result of performing a simulation on a change in temperature during a heating process related to the configuration of the present invention, that is, the configuration in which the heating/cooling composite fin 200 is inserted, one for four battery cells 112, and the coating films 240, the cooling fins 230, the heating films 220, and the compressive pad 210 are sequentially disposed on an outermost surface of the battery module 100, as illustrated in FIG. 2. That is, a total of six heating films 220 are arranged. Each of the heating films 220 is configured to generate heat of 15 W, such that the heat of 90 W is generated in the entire battery module 100. Meanwhile, FIG. 6 illustrates a result of performing a simulation on a change in temperature related to the configuration of the comparative example, that is, the configuration in which a heater is attached to a portion on which the busbar 116 of the battery module 100 is positioned as illustrated in the left view, and the configuration in which a heater is attached to a bottom surface of the battery module 100 as illustrated in the right view. The simulation was analyzed by a computer fluid dynamic (CFD) method.

As illustrated in FIG. 5, according to the exemplary embodiment of the present invention, when the heating was initially started at −30° C., it took about 3,600 seconds for a temperature of the battery module 100 to increase to 0° C. In addition, it can be ascertained that even in the heating process, the temperature uniformly increases over the entire battery module 100.

In contrast, as illustrated in FIG. 6, in the comparative example in which the heating process was performed for 3,600 seconds, the temperature reached 0° C. only at a portion in the vicinity of the portion on which the heater was positioned, and the temperature was not increased at a portion distant from the heater. As a result, it can be ascertained that a great temperature deviation occurred in the module.

As described above, according to the exemplary embodiment of the present invention, it is possible to quickly and uniformly raise the temperature of the battery module, even in a low-temperature environment, to a temperature at which the battery module normally operates, it is possible to efficiently discharge, to the outside, the heat generated from the battery module when the battery module operates, and it is possible to uniformly disperse the heat to the entire battery module during the heating and cooling processes. As a result, it is possible to prevent degradation of the battery module and safely operate the battery module.

Meanwhile, one or more battery modules according to the exemplary embodiment of the present invention may be packaged in a pack casing, thereby forming a battery pack.

The above-mentioned battery module and the battery pack including the battery module may be applied to various devices. Examples of such devices may include transportation means such as an electric bicycle, an electric vehicle, and a hybrid vehicle, but the present invention is not limited thereto, and may be applied to various devices that may use the battery module and the battery pack including the battery module. These configurations may also belong to the scope of the present invention.

Although preferred examples of the present invention have been described in detail hereinabove, the right scope of the present invention is not limited thereto, and many variations and modifications of those skilled in the art using the basic concept of the present invention, which is defined in the following claims, will also belong to the right scope of the present invention.

DESCRIPTION OF SYMBOLS

100: Battery module
110: Battery cell stack
120: Module frame
140: Resin layer
200: Heating/cooling composite fin
210: Compressive pad
220: Heating film 230: Cooling fin
240: Coating film

The invention claimed is:

1. A battery module comprising:
a battery cell stack including a plurality of battery cells stacked parallel to one another; and
a heating/cooling composite fin interposed between adjacent ones of the plurality of battery cells,
wherein the heating/cooling composite fin comprises: a compressive pad positioned between the adjacent battery cells; a pair of cooling fins, each of the pair of cooling fins positioned between the compressive pad and a respective one of the adjacent battery cells; and a pair of heating films, each of the pair of heating films positioned between the compressive pad and a respective one of the pair of cooling fins.

2. The battery module of claim 1, wherein:
the heating/cooling composite fin further comprises a pair of coating films, each of the pair of coating films positioned between a respective one of the pair of cooling fins and a respective one of the adjacent battery cells.

3. The battery module of claim 1, wherein:
each of the pair of heating films comprises: a heating element connected to an external power source and configured to generate heat; and a base film on which the heating element is disposed.

4. The battery module of claim 1, further comprising:
a module frame comprising at least one surface on which the battery cell stack is positioned; and
a resin layer positioned between the battery cell stack and the module frame,
wherein the pair of cooling fins are in contact with the resin layer.

5. The battery module of claim 1, wherein:
the pair of cooling fins are made of aluminum.

6. The battery module of claim 1, wherein:
the compressive pad contains polyurethane or EDPM (ethylene propylene diene monomer).

7. The battery module of claim 2, wherein:
each of the pair of coating films is a graphite coating.

8. The battery module of claim 1, wherein:
the plurality of battery cells are stacked along a stacking axis, the heating/cooling composite fin having a first dimension orthogonal to the stacking axis that corresponds to at least a portion of a second dimension of the battery cell stack parallel to the first dimension.

9. The battery module of claim 2, wherein:
the plurality of battery cells are stacked along a stacking axis,
the compressive pad, the pair of cooling fins, and the pair of heating films each having a first dimension orthogonal to the stacking axis that corresponds to at least a portion of a second dimension of the battery cell stack parallel to the first dimension, and
the plurality of coating films each have a third dimension parallel to the first dimension that is equal to the second dimension of the battery cell stack.

10. The battery module of claim 9, wherein:
the pair of coating films each have an area along a plane orthogonal to the stacking axis that is equal to a cross-sectional area of the battery cell stack orthogonal to the stacking axis.

11. A battery pack comprising:
at least one battery module according to claim 1; and
a pack casing configured to receive the at least one battery module.

12. A device comprising:
at least one battery pack according to claim 11.

* * * * *